Jan. 13, 1931.  W. S. SHENK  1,789,159
VINE DIVIDER
Filed Dec. 6, 1929   2 Sheets-Sheet 1

William S. Shenk
INVENTOR

BY Victor J. Evans
ATTORNEY

WITNESS J. T. L. Wright

Jan. 13, 1931. W. S. SHENK 1,789,159
VINE DIVIDER
Filed Dec. 6, 1929 2 Sheets-Sheet 2
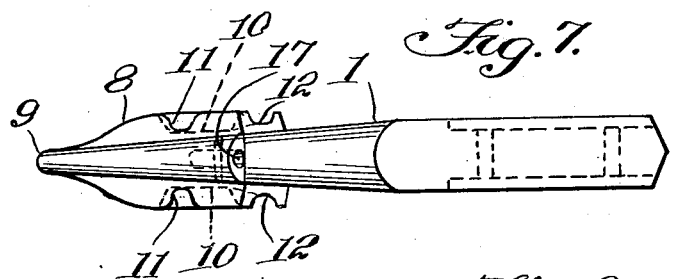
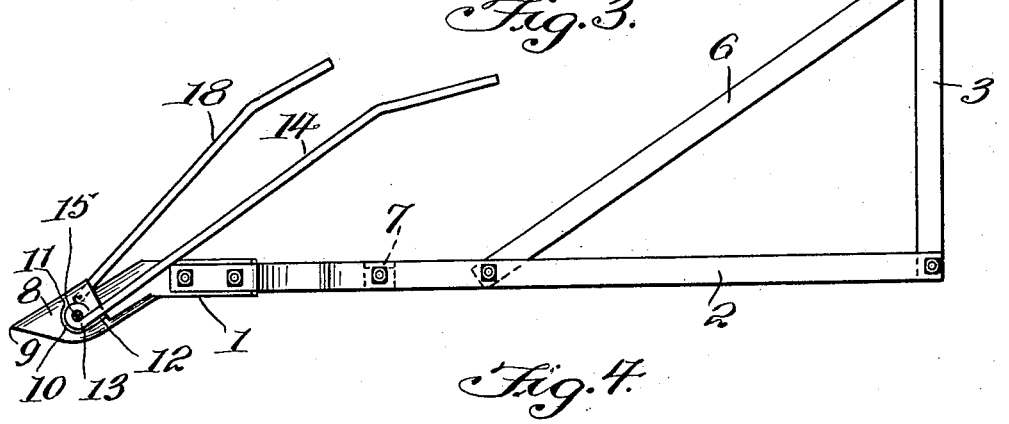
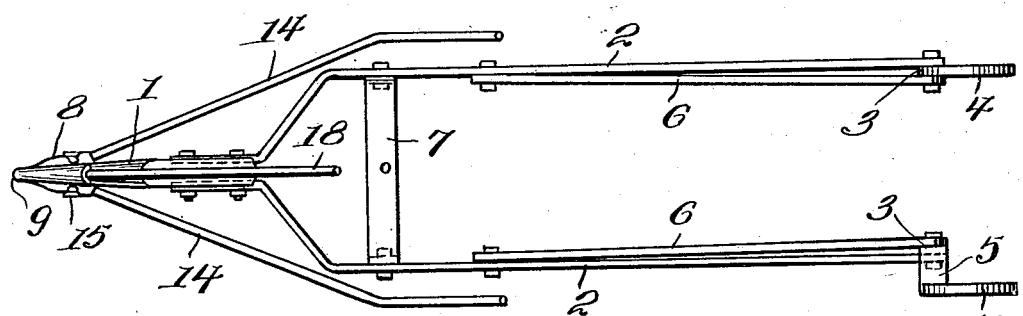
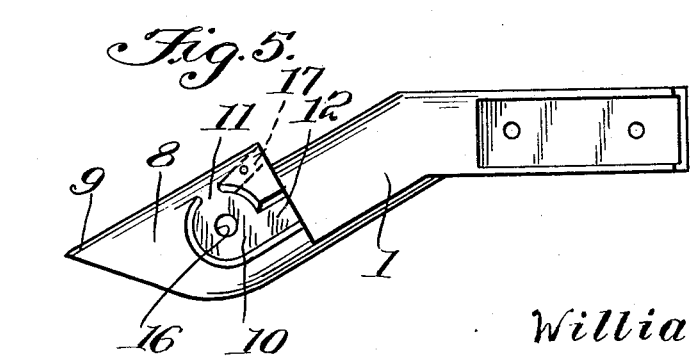
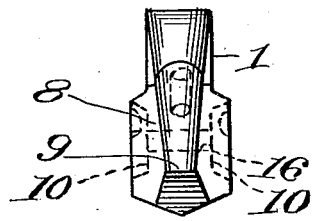
William S. Shenk
INVENTOR
BY Victor J. Evans
ATTORNEY
WITNESS J. T. L. Wright Patented Jan. 13, 1931

1,789,159

UNITED STATES PATENT OFFICE

WILLIAM S. SHENK, OF LANCASTER, PENNSYLVANIA, ASSIGNOR OF ONE-THIRD TO BENJAMIN R. LANDIS AND ONE-THIRD TO ELMER K. LANDIS, BOTH OF LANCASTER, PENNSYLVANIA

VINE DIVIDER

Application filed December 6, 1929. Serial No. 412,269.

This invention relates to an attachment for a spraying device, though the attachment may be used on other kinds of agricultural implements, the general object of the invention being to provide simple means for dividing the vines in front of the wheels of the implement so that the vines will not be injured by the wheels.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 3 is a side view thereof.

Figure 4 is a plan view thereof.

Figure 5 is a side view of the runner.

Figure 6 is a front end view thereof.

Figure 7 is a top plan view thereof.

Figure 1:
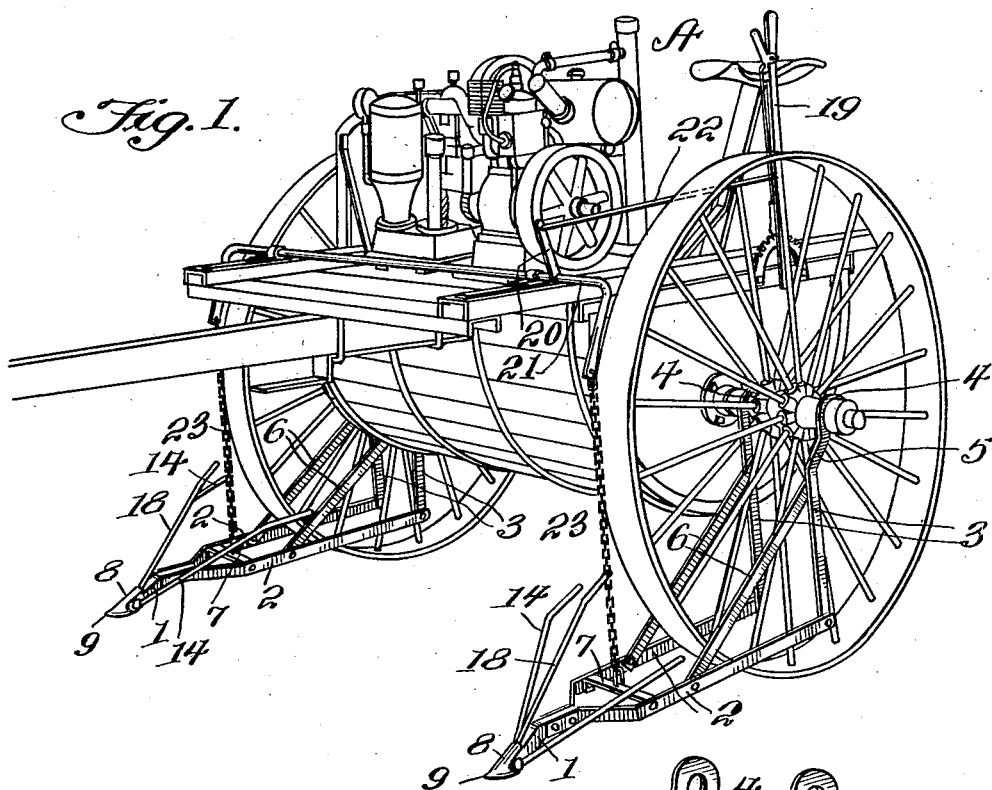
Figure 1 is a perspective view showing the invention in use on a spraying machine.
Figure 2:
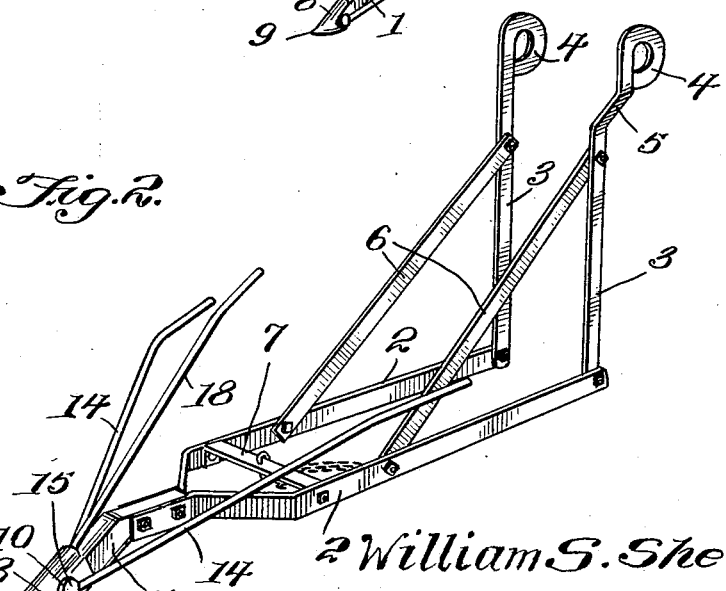
Figure 2 is a perspective view of one of the devices.

In these views, the numeral 1 indicates a runner arm which is formed with a horizontal rear part to each side of which is bolted a side bar 2, these side bars having convergent front ends and an upright member 3 is fastened to the rear end of each side bar. Each upright member has an eye 4 at its upper end for receiving a part of the spindle of an implement, such as the spraying machine shown in Figure 1. The outer upright member is offset at its upper end, as shown at 5, so that the parts will be positioned with the runner directly in front of the wheel. A brace 6 connects each upright member to a side member and a cross piece 7 connects the front portions of the two side members together. The front part of the runner arm 1 slopes downwardly and forwardly as shown, and the front end of the arm is formed with an enlargement 8, the front end of which is provided with a point 9, the under part of which slopes upwardly and forwardly, as clearly shown in Figure 5. A circular recess 10 is formed in each side face of the enlargement, with notches 11 and 12 in the walls of the recess so that an eye 13, formed on the front end of a spring finger 14, can fit in the recess with a part of the finger extending through the notch 12. A bolt 15 extends through a hole 16, the ends of which open out at the center of the recesses and this bolt passes through the eyes 13 so that the fingers 14 are firmly fastened to the enlargement. A socket 17 is formed in the upper rear part of the enlargement to receive the front end of a finger 18. The fingers are formed of rods and said fingers extend upwardly and rearwardly with the finger 18 arranged between the fingers 14, but above the planes of said fingers.

Thus it will be seen that the arm 1 with its fingers will travel along in front of each wheel of the implement and thus the vines will be divided so that the wheel will not pass over the vines and injure the same.

The two devices can be adjusted toward and away from the ground from a hand lever 19 suitably connected with the implement and connected to the arm 20 of a crank shaft 21 by a link 22, the cranked ends of the shaft being connected with the cross pieces 7 by the chains 23. Thus by adjusting the lever 19, the crank is rocked to cause the chains to raise and lower the device, as desired.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. In combination with an agricultural implement having a wheel, a frame suspended from the spindle of the wheel and having a forwardly extending part, an arm connected with said forwardly extending part and placed in front of the wheel, upwardly and rearwardly extending fingers carried by the arm, said arm having its forward end extending downwardly, a shoe connected with said end, said shoe having a recess in each side thereof and the side fingers having eyes fitting in the recesses and a bolt passing through the shoe and through the eyes for connecting the side fingers to the shoe.

2. In combination with an agricultural implement having a wheel, a frame suspended from the spindle of the wheel and having a forwardly extending part, an arm connected with said forwardly extending part and placed in front of the wheel, upwardly and rearwardly extending fingers carried by the arm, said arm having its forward end extending downwardly, a shoe connected with said end, said shoe having a recess in each side thereof and the side fingers having eyes fitting in the recesses, a bolt passing through the shoe and through the eyes for connecting the side fingers to the shoe and a socket in the upper rear part of the shoe for receiving the central finger.

In testimony whereof I affix my signature.

WILLIAM S. SHENK.